United States Patent [19]

Ringer et al.

[11] Patent Number: 5,167,800
[45] Date of Patent: Dec. 1, 1992

[54] APPARATUS FOR TREATMENT OF ACIDIC WATER STREAMS

[75] Inventors: Darwin J. Ringer; Robbin J. Ringer, both of Albright; Milford C. Jenkins, Kingwood; Michael J. Jenkins, Albright, all of W. Va.

[73] Assignee: Aquafix, Kingwood, W. Va.

[21] Appl. No.: 677,015

[22] Filed: Mar. 28, 1991

[51] Int. Cl.⁵ ............................................. C02F 1/66
[52] U.S. Cl. .................................. 210/101; 210/170; 210/205; 137/98; 137/101.11; 222/334
[58] Field of Search .................... 210/97, 98, 101, 170, 210/171, 172, 198.1, 205, 206; 137/98, 101.11; 222/334

[56] References Cited

U.S. PATENT DOCUMENTS

| | | | |
|---|---|---|---|
| 1,698,537 | 1/1929 | Cushwa | 210/206 |
| 1,722,571 | 7/1929 | Green | 210/206 |
| 2,080,872 | 5/1937 | Paterson | 137/101.11 |
| 3,142,639 | 7/1964 | Baer et al. | 210/60 |
| 3,456,801 | 7/1969 | Bowles | 210/169 |
| 3,595,393 | 7/1971 | Messa et al. | 210/206 |
| 3,996,953 | 12/1976 | Scragg | 137/101.11 |
| 4,116,834 | 9/1978 | King | 210/206 |

OTHER PUBLICATIONS

Water Treatment Machine Brochure from Gordon & Price, Inc.

Primary Examiner—Thomas Wyse
Attorney, Agent, or Firm—Kirkpatrick & Lockhart

[57] ABSTRACT

An apparatus and method are described for treating a flowing water stream with a chemical treatment agent. In particular, the apparatus includes a hopper for containing the chemical treatment agent, an auger for discharging the chemical treatment agent from the hopper into the flowing water stream, and a water wheel which provides an adjustable amount of mechanical energy for driving the auger to discharge the chemical agent into the flowing water stream at a rate proportional to the amount of mechanical energy provided by the water wheel. The apparatus is relatively light in weight with minimal dimensions to provide portability for locating the apparatus in remote locations. Further, the apparatus requires minimal human supervision because it uses the flowing water stream as an energy source and is mechanically simple.

18 Claims, 4 Drawing Sheets

APPARATUS FOR TREATMENT OF ACIDIC WATER STREAMS

BACKGROUND OF THE INVENTION

1. Field of the Invention

The invention relates to a method and apparatus for chemically treating an acidic water stream. More particularly, the present invention relates to a portable apparatus which can be easily transported to a remote location for treating an acidic water stream with a minimal amount of human supervision. Furthermore, the apparatus uses the energy of the flowing water in the stream to disperse a treatment chemical agent into the acidic water stream.

2. Description of the Prior Art

Acidic water streams have frequently occurred as a result of coal mining operations. The acidic water streams occurred when natural water flowed through mines and piles of waste materials from mines. The flowing natural water dissolves and carries away various compounds when the water contacts the minerals in the mine or mine waste materials. In particular, if the mining operation involves high sulfur coal then the water will dissolve and carry away sulfur compounds. The dissolved sulfur increases the acidity of the water streams.

The resulting highly acidic water streams represent a significant environmental detriment to water quality in areas where mining operations for high sulfur coals occur. When the highly acidic water stream flows into naturally occurring water streams it greatly diminishes or eliminates the ability of that stream to support aquatic life such as fish. In fact, this form of pollution is common in areas of Pennsylvania, West Virginia and Ohio where high sulfur coals are mined, and is evidenced by orange or yellow colored streams and rivers (i.e., the orange and yellow coloring comes from the precipitation of iron sulfates).

As a result of enactment of various environmental statutes, the operators of high sulfur coal mining operations have developed methods for treating acidic water streams that flow from mines and mine waste piles. In particular, these methods conventionally involve collecting the water into large ponds and then treating the pond with treatment chemicals before discharging the treated water from the pond into naturally occurring streams and rivers. One common treatment involves the addition of lime to the pond where the acidic water is impounded. The lime neutralizes the acidity of the water. This method of treatment suffers from the disadvantage of providing poor mixing between the lime and the water in the pond because the pond water is relatively still. Consequently, excessively large amounts of lime are required to neutralize the acidic water in the pond.

Other methods and apparatus have also been used for neutralizing acid mine drainage water. For example, U.S. Pat. No. 3,142,639 generally describes a method for neutralizing acid mine drainage in which the acid mine drainage is transferred to a mixing container, a solid neutralizing agent is fed into the mixing container from a hopper, the acid mine drainage and the neutralizing agent are mixed in the mixing container, and the treated acid mine drainage water is discharged into a settling basin. The apparatus for practicing this method includes a pump for both transferring the acid mine drainage to the mixing container and transferring the neutralized acid mine drainage water to the settling basin. The pump is either electrically powered or powered by an internal combustion engine.

Likewise, U.S. Pat. No. 4,116,834 describes an apparatus which can be used for neutralizing acid mine drainage by feeding lime from a hopper into a lime slurry tank where the lime is mixed with water to form a slurry and then feeding the lime slurry into a mixing tank where the lime slurry is mixed with the water to be treated. The apparatus of this patent includes a motor driven feeder for transferring the lime to the lime slurry tank and motor driven mixers for the lime slurry tank and the mixing tank. These motors are electrically powered.

Other references also describe similar methods for treating a water stream. For example, U.S. Pat. Nos. 1,722,571; 3,456,801; and 3,595,393 generally describe a water treatment method in which a solid treating agent is added to a portion of the water to be treated in a mixing container and then discharged into another body of water.

The methods and apparatus described in these patents for treating water include the step of taking a portion of the water from the body of water to be treated and mixing the treating agent with that portion of the water in a mixing container before discharging the treated portion of the water back to the overall body of water. This mixing step introduces additional mechanical complexity to the apparatus. Moreover, most of these apparatus and methods require an electrical power supply or an internal combustion engine to power various parts of the apparatus. Thus, these conventional methods and apparatus for treating water streams require frequent human supervision due to their mechanical complexity and due to their use of electrical power or internal combustion engines for power.

Consequently, there is a need for improved apparatus and methods for effectively treating acidic water streams from coal mining operations. In particular, such apparatus would be easily portable to remote locations, require no electrical or internal combustion engine power sources, and be mechanically simple to minimize human supervision.

SUMMARY OF THE INVENTION

The present invention provides an apparatus and method which is useful for treating a flowing water stream with a chemical treatment agent. In particular, the present invention is useful for treating acidic water streams from coal mining operations with a solid chemical agent such as pelletized lime. The present invention overcomes disadvantages of conventional methods for treating acidic mine streams which require a mixing step. Further, the present invention does not require electrical power supplies or internal combustion engines as do conventional apparatus. Instead, the present invention utilizes the energy of the flowing water stream to power the apparatus of the present invention. In addition, the apparatus of the present invention is easily transported to remote locations and requires minimal human supervision due to its mechanical simplicity and use of a flowing water stream as a power source.

The apparatus of the present invention generally comprises a means for containing chemical treatment agent, a means for discharging the chemical agent from the containing means to the flowing water stream, a means for generating mechanical energy, and a means for transferring the mechanical energy to the discharging means. The means for discharging the chemical agent into the flowing water stream provides a rate of discharge which is proportional to the mechanical energy transferred to the discharging means. In addition, the mechanical energy generating means must generate its energy from the flowing water stream, and be adjustable to provide variable amounts of mechanical energy to the discharging means thereby varying the rate of discharge of the chemical agent.

Preferably, the means for containing the chemical treatment agent is a hopper with a lid for placing chemical agent into the hopper and an opening where chemical agent can be removed from the hopper.

The means for discharging the chemical agent into the flowing water stream preferably is a pipe enclosing an auger such that the pipe connects with the opening in the hopper and the pipe further includes an opening for discharging the chemical agent to the flowing water stream. The auger is rotatable, and when rotated, chemical agent is transferred by the auger from the hopper out of the opening in the pipe and onto the surface of the flowing water stream.

The means for generating mechanical energy from the flowing water stream preferably comprises a water wheel. The water wheel generates mechanical energy from contact with the flowing water stream or a portion of the flowing water stream. Mechanical energy from the water wheel is then transferred to the discharging means.

Preferably, the apparatus of the present invention further includes a means for channeling the flowing water stream into proximity with the discharging means. The channeling means comprises a conduit with a wide mouth which funnels flowing water from the stream into a narrow channel. The conduit is positioned so that the narrow channel with the concentrated flow of water is immediately proximate to the discharge means thereby providing exposure of the chemical agent to an increased amount of water from the flowing water stream.

The method of the present invention generally comprises the steps of containing the chemical treatment agent above the flowing water stream, generating an adjustable amount of mechanical energy from the flow of a portion of the flowing water stream, and using the generated mechanical energy for discharging the chemical treatment agent into the flowing water stream so that the chemical agent is discharged at a rate proportional to the amount of mechanical energy derived from the flowing water stream. In addition, the method preferably includes the step of channeling the flowing water stream into proximity with the point where the chemical agent is discharged into the flowing water stream.

Preferably both the method and apparatus of the present invention use chemical treatment agent in pellet form.

BRIEF DESCRIPTION OF THE DRAWINGS

The present invention can be better understood by reference to the drawings in which.

DESCRIPTION OF THE PREFERRED EMBODIMENTS

Generally, the apparatus of the present invention includes a means for containing a chemical treatment agent, a means for discharging the chemical agent into a flowing water stream, a means for generating an adjustable amount of mechanical energy from the flowing water stream, and a means for transferring mechanical energy from the generating means to the discharging means so that the rate of discharge of the chemical agent is proportional to the amount of mechanical energy transferred to the discharging means.

Figure 1:
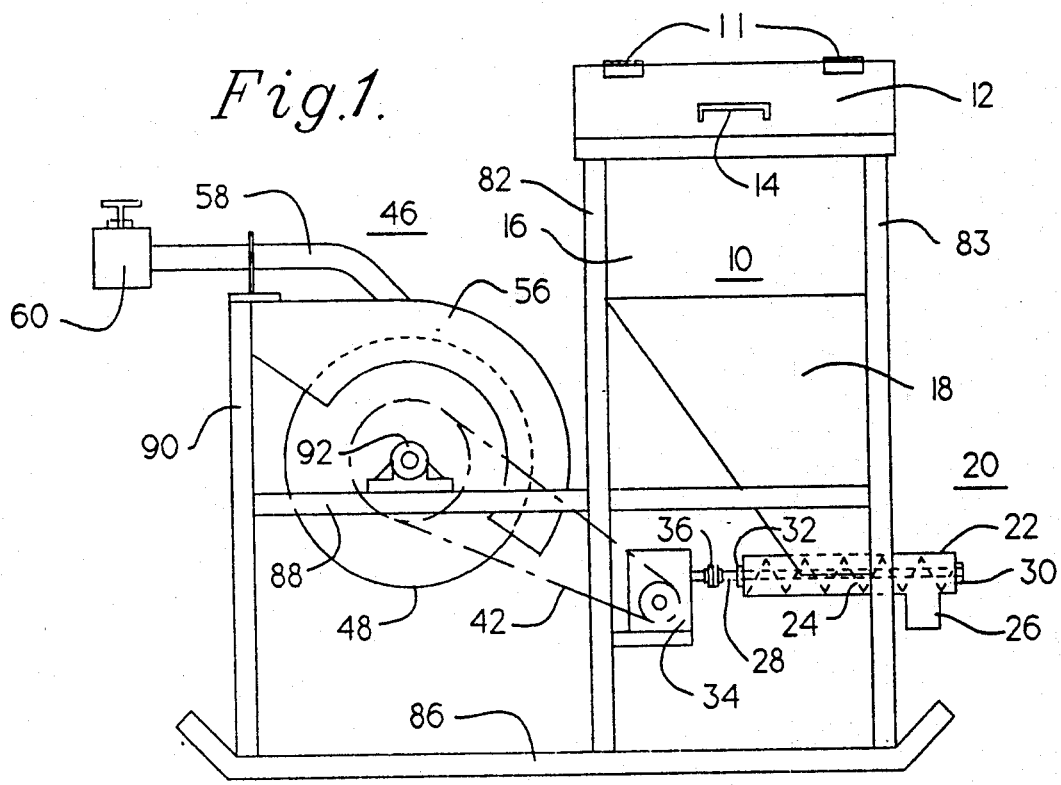
FIG. 1 is a front view of the apparatus of the present invention.
Figure 2:
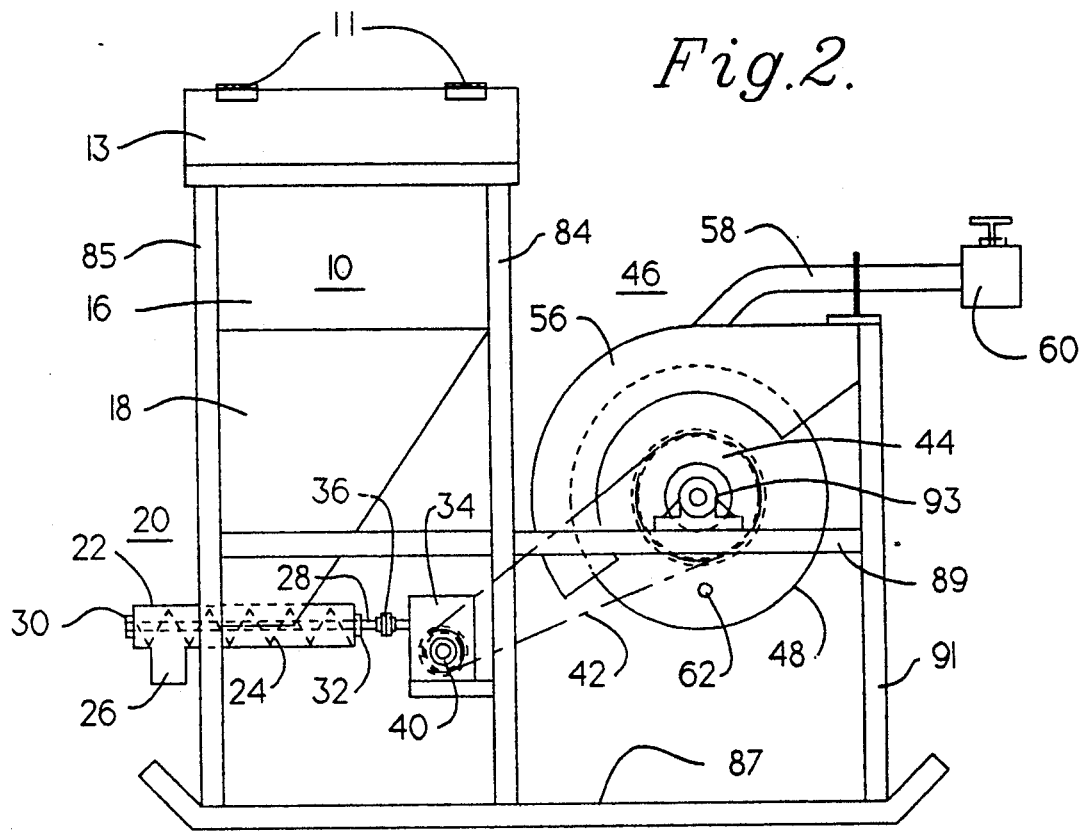
FIG. 2 is a back view of the apparatus of the present invention.

Referring now to FIGS. 1 and 2, front and back views of the apparatus of the present invention are shown. The apparatus includes a hopper 10 with an attached lid 12. The top of the hopper 10 is configured like a peak with two surfaces. The lid 12 makes up one surface of the peaked top of the hopper 10. The other surface 13 of the peaked top is contiguous with the rest of the body of the hopper 10. The lid 12 is attached by hinges 11 to top surface 13 of the hopper 10. The lid 12 includes a handle 14 for manually raising the lid 12 by rotating it on its hinges 11 so that the hopper 10 can be filled with the chemical treatment agent.

The hopper 10 further includes a top portion 16 and a bottom portion 18. The top portion 16 of the hopper 10 has a square cross section with vertical sides. The bottom portion 18 of the hopper 10 has three sides which slant inwards toward a common point and a fourth side which is vertical. Thus, the overall shape of the bottom portion 18 of the hopper 10 is funnel-like. A long, narrow rectangular opening is located at the lowest point of the funnel-like bottom portion 18 of the hopper 10. This geometry of the hopper insures that any chemical agent in the hopper 10 will be channeled to the opening at the lowest point of the funnel-like bottom portion 18 of the hopper 10. Preferably, the hopper 10 is constructed from ⅛th inch steel sheet. The hopper 10 functions as a means for containing the chemical treatment agent.

Figure 3:
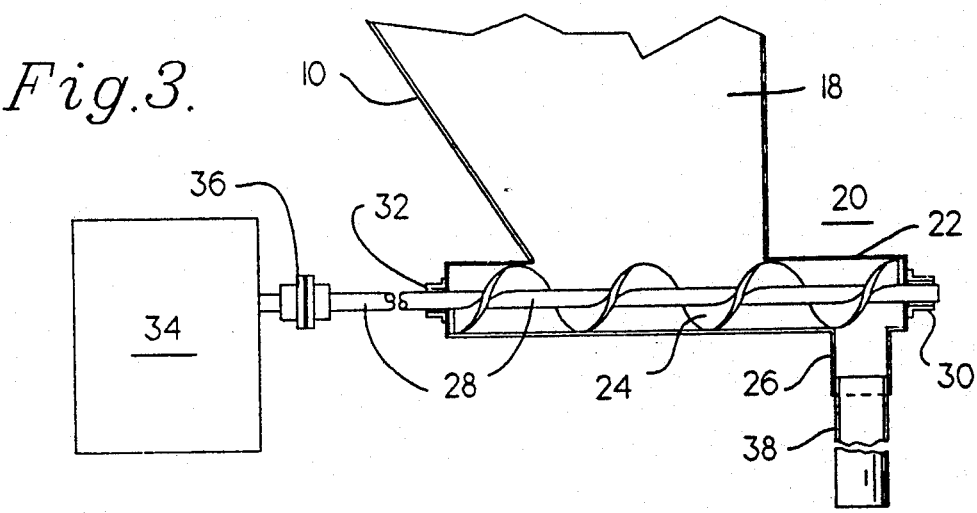
FIG. 3 is a side cross-sectional view of the discharging means of the present invention.
Figure 4:
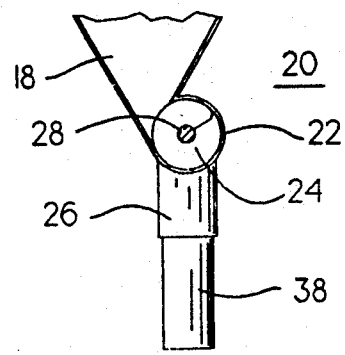
FIG. 4 is an end cross-sectional view of the discharging means of the present invention.
Figure 5:
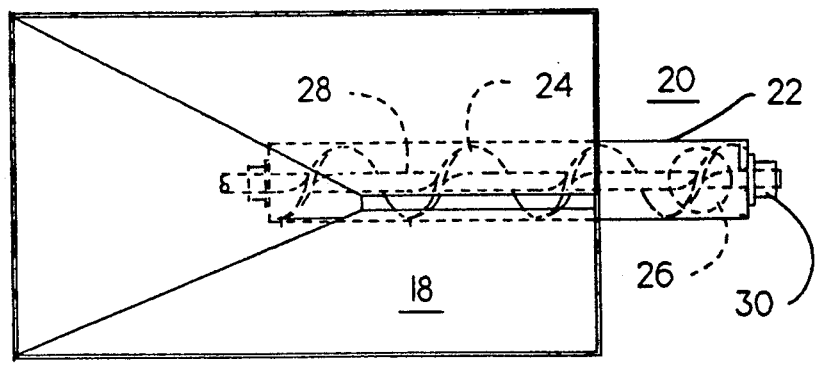
FIG. 5 is a top view of the discharging means of the present invention as seen from inside the containing means.

Referring to FIGS. 3, 4 and 5, the apparatus of the present invention includes a means 20 for discharging the chemical treatment agent from the hopper 10 into the flowing water stream. The discharging means 20 includes a pipe 22 which encloses an auger 24 attached to a shaft 28. An opening is cut into the pipe 22 which matches the long, narrow rectangular opening in the bottom portion 18 of the hopper 10. The edge of the opening in the pipe 22 is then welded to the edge of the opening in the bottom portion 18 of the hopper 10. In this manner the pipe 22 and auqer 24 are supported by the hopper 10. This configuration of the pipe 22 and hopper 10 allows chemical treatment agent from the hopper 10 to be transferred into the interior of the pipe 22.

As shown in FIG. 4, the opening in the bottom portion 18 of the hopper 10 is not oriented horizontally. Instead, the opening is oriented at an angle so that when the pipe 22 is welded to the bottom portion 18 of the hopper 10 one side of the bottom portion 18 of the hopper 10 extends and is welded to the bottom of the pipe 22, and the opposing side of the bottom portion 18 of the hopper 10 extends and is welded to the top edge of the pipe 22. This geometry substantially insures that the chemical treatment agent is transferred into the side of the pipe 22 and auger 24 thereby preventing the weight of the chemical treatment agent from resting on top of the auger 24. If the opening between the pipe 22 and bottom portion 18 of the hopper 10 were oriented horizontally and above the auger 24, then the weight of the chemical treatment agent would tend to interfere with the rotation of the auger 24.

The pipe 22 is oriented horizontally and includes a short vertical pipe 26 at one end of the pipe 22. The vertical pipe 26 communicates with the interior of the main pipe 22 and opens downwards towards the surface of the flowing water stream. The shaft 28 extends at one end into bushing 30 which is fixed at one end of pipe 22. As shown in FIG. 3, the shaft 28 extends through bushing 32 which is fixed at the other end of the pipe 22. Thus, this end of the shaft 28 extends beyond the pipe 22, and is coupled to the shaft of a gear box 34 by a flexible coupling 36.

When the shaft 28 and auger 24 are rotated, the chemical treatment agent is transferred from the hopper 10 along the pipe 22 until it falls out of vertical pipe 26 onto the surface of the flowing water stream. It should be appreciated that the rate at which chemical treatment agent is discharged by the auger 24 is proportional to the rate of rotation of the auger 24. The pipes 22 and 26, auger 24, and shaft 28 jointly function as means for discharging chemical treatment agent from the hopper 10 to the flowing water stream.

Preferably, pipes 22 and 26 consist of 4 inch steel tubing which is 3/16th inch thick. The auger 24 is nominally 4 inches in diameter, however the outer diameter of the auger 24 is actually less than 4 inches so that about a ⅛th inch clearance is provided between the outer diameter of the auger 24 and the inner diameter of the pipe 22. The shaft 28 is ¾ inch steel rod.

Preferably, a plastic pipe 38 is loosely fitted within vertical pipe 26. The plastic pipe 38 is useful for protecting the chemical treatment agent from dispersion by wind as it falls out of the vertical pipe 26 onto the surface of the flowing stream. It should be appreciated that the plastic pipe 38 is cut to a length such that the bottom of the plastic pipe 38 will be located immediately above the surface of the flowing water stream. In addition, the plastic pipe 38 can be positioned within the pipe 26 to adjust to various heights of the surface of the flowing water stream.

Referring to FIG. 2, the gear box 34 includes a sprocket 40 and a shaft which connects to flexible coupling 36. The sprocket 40 is driven by a chain 42. The chain 42 is in turn driven by a sprocket 44 attached to water wheel 46. The chain 42 and sprockets 40 and 44 are protected by an expanded metal guard (not shown). The gear box 34, flexible coupling 36, and chain 42 jointly function as a means for transferring mechanical energy from the water wheel 46 to the shaft 28 of the auger 24.

Any commercially available gear box may be used for gear box 34. In particular, a gear box manufactured by Hub City with a 20 to 1 gear ratio has been found to be effective for use in the apparatus of the present invention.

Figure 6:
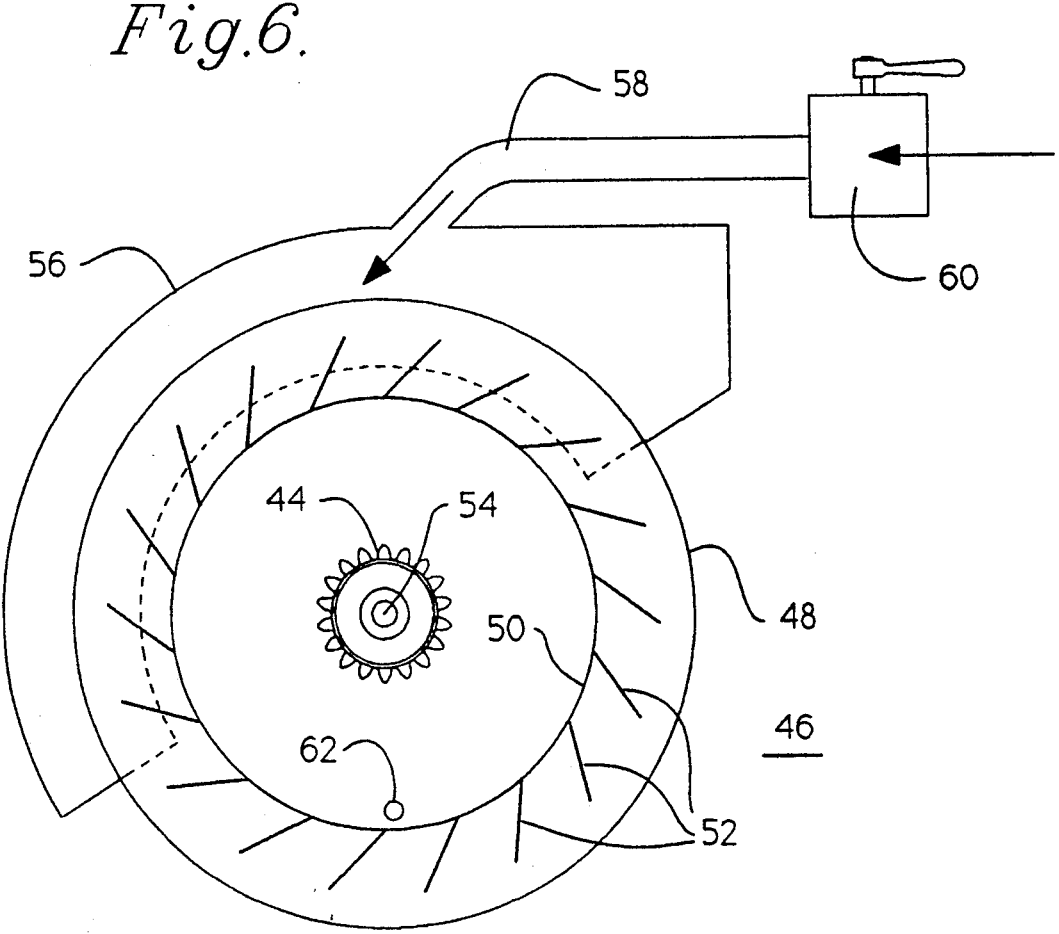
FIG. 6 is a side cross-sectional view of the means for generating mechanical energy of the present invention.

Referring now to FIG. 6, the water wheel includes two disks 48 of the same size which are spaced about 6 inches apart, a band 50 which is located about 3 inches in from the outer circumference of the two disks 48 and interconnects the two disks 48 with each other, and a series of plates 52 which extend outwards at an angle from the band 50 in between the two disks 48 and form receptacles for receiving water. A shaft 54 extends through the center of the two disks 48. The sprocket 44 connects to the shaft 54 on one side of the water wheel 46. A cover 56 fits over and around the water wheel 46 from a position of about 30° through a position of about 210° going counterclockwise. A pipe 58 runs parallel to the top of the cover 56 and then angles down to connect with the cover 56 at a point at the top of the water wheel 46. The pipe 58 includes a valve 60 for varying the amount of water flowing through the water wheel 46. A ball valve has been used effectively for valve 60. One end of a hose (not shown) would be connected to the valve 60 and the other end of the hose would be placed in the flowing water stream upstream of the apparatus. Thus, the hose would provide a flow of water for the water wheel 46.

In this manner, water flows through the pipe 58 and enters the top of the water wheel 46 where it impacts against the receptacles and causes the water wheel 46 to turn thereby generating mechanical energy. It should be appreciated that the mechanical energy generated by the water wheel 46 is proportional to the amount of water impacting the water wheel. As the water wheel 46 turns, the receptacles filled with water empty their water as they approach the bottom point of the water wheel's rotation. Thus, the water wheel 46 functions as a means for generating mechanical energy from a portion of the flowing water stream.

In addition, a small threaded drain plug 62 is provided for the water wheel 46. The threaded drain plug 62, when removed, communicates with the interior space formed by the two disks 48 and the band 50. Preferably, the threaded drain plug 62 is located as close to the band 50 as possible. Consequently, water which may accumulate inside the water wheel 46 due to leakage may be removed. The water wheel cover 56 and pipe 58 may be made out of normal steel. Preferably, however, stainless steel is used to reduce corrosion from contact with the acidic water stream.

Figure 7:
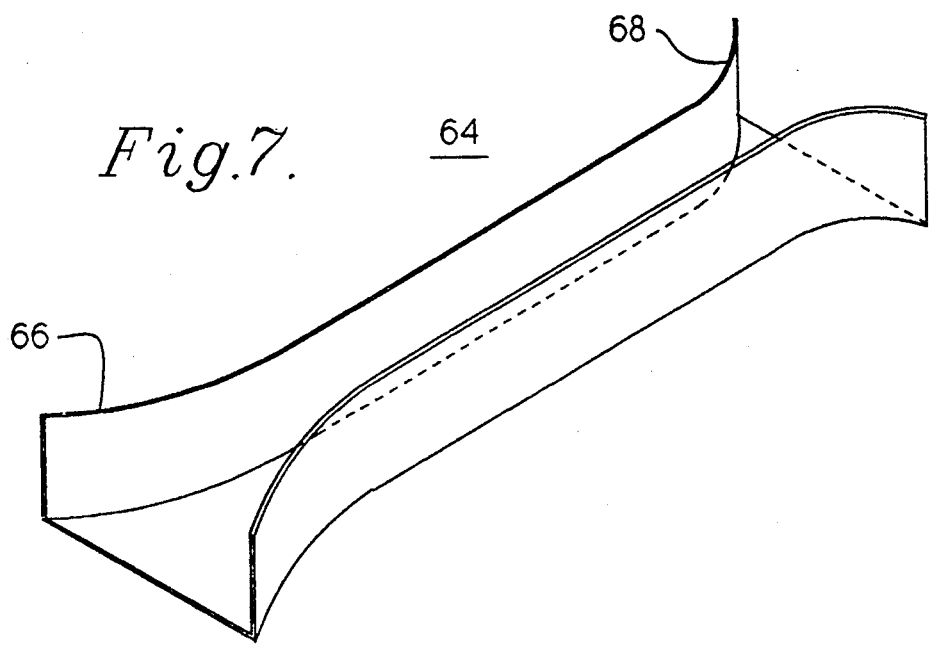
FIG. 7 is a perspective view of the water channeling means of the present invention.

Referring to FIG. 7, a means for channeling the flow of water beneath the apparatus of the present invention is shown. The channeling means consists of a three sided conduit 64 which has a large fluted end 66 and a smaller fluted end 68. The conduit 64 is placed into the flowing water stream such that the large fluted end 66 faces upstream and the small fluted end 68 faces downstream. The apparatus of the present invention is then positioned over the conduit 64 such that the vertical pipe 26 and plastic pipe 38 are positioned immediately above the narrow part of the conduit 64 adjacent to the smaller fluted end 68. The conduit 64 is preferably made from moldable plastic. As a result of the use of the conduit 64 the chemical agent discharged by the apparatus of the present invention will contact an increased amount of water due to the channeling effect of the conduit 64 than would otherwise occur by discharging the chemical agent onto the surface of the flowing stream as it naturally exists.

Figure 8:
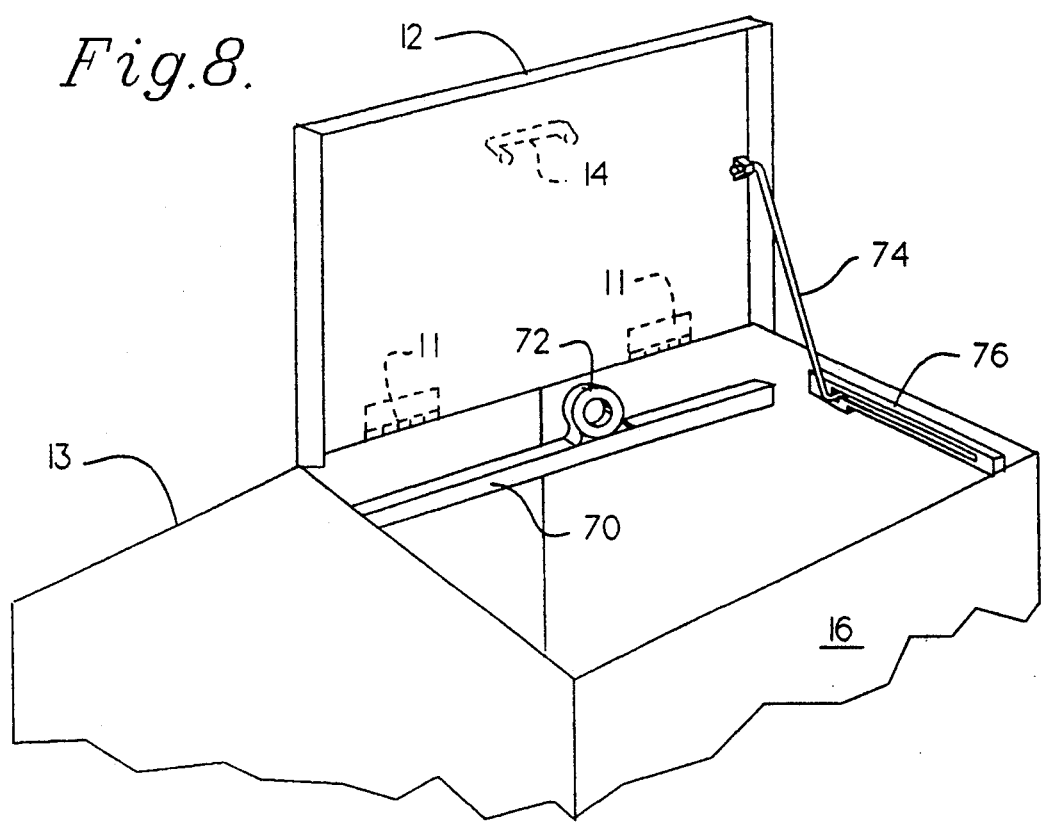
FIG. 8 is a cut-away perspective view of the top of the containing means of the present invention with the lid open.

Referring now to FIG. 8, a detailed perspective view of the top of the hopper 10 is provided with the lid 12 open. Inside of the top of the hopper 10 a cross member 70 horizontally connects each of the two peak sides of the top portion 16 of the hopper 10. Attached to the top of the cross member 70 is an eye 72. A crane with a hook may be connected to the eye 72 and thereby the crane may be used to lift and position the apparatus of the present invention as desired.

In addition, the lid 12 of the hopper 10 includes a rod 74 which is pivotally attached to one side edge of the lid 12. The other end of the rod 74 engages a slotted bracket 76 which is attached to a peaked side of the top portion 16 of the hopper 10. This slotted bracket 76 includes a cutout notch such that the lid 12 of the hopper 10 can be raised and locked in an open position by placing the end of the rod 74 in the cutout notch of the slotted bracket 76.

Referring to FIGS. 1 and 2, the hopper 10, water wheel 46, and gear box 34 are supported above the flowing water stream by a base. The base includes four vertical members 82, 83, 84 and 85 which are welded to the corners of the top portion 16 of the hopper 10. Vertical members 82 and 83 at the front of the apparatus are welded to a base member 86 as shown in FIG. 1. Likewise, vertical members 84 and 85 at the back of the apparatus are welded to base member 87 as shown in FIG. 2. Two members 90 and 91 are also welded to base members 86 and 87, respectively, and rise upwards at an angle such that the tops of each member 90 and 91 are welded to the sides of the cover 56 of the water wheel 46.

Two members 88 and 89 are welded to members 90 and 91 and run parallel to base members 86 and 87. The members 88 and 89 are welded to two cross braces (not shown) which run horizontally between vertical members 82 and 84, and 83 and 85, respectively. In addition, the members 88 and 89 include brackets 92 and 93 with ball bearings in which the shaft of the water wheel 46 rotates. The members 88 and 89 are welded to the front and back sides of the hopper 10 at the bottom portion 18 of the hopper 10. The gear box 34 is supported by a right angle member (not shown) which extends downwards and then horizontally underneath the gear box 34 from the cross brace (not shown) between vertical members 82 and 84. Members 86, 87, 88, 89, 90 and 91 along with the cross braces (not shown) are made from square steel tubing. Vertical members 82, 83, 84, and 85 are made from ¼th inch angle iron.

Figure 9:
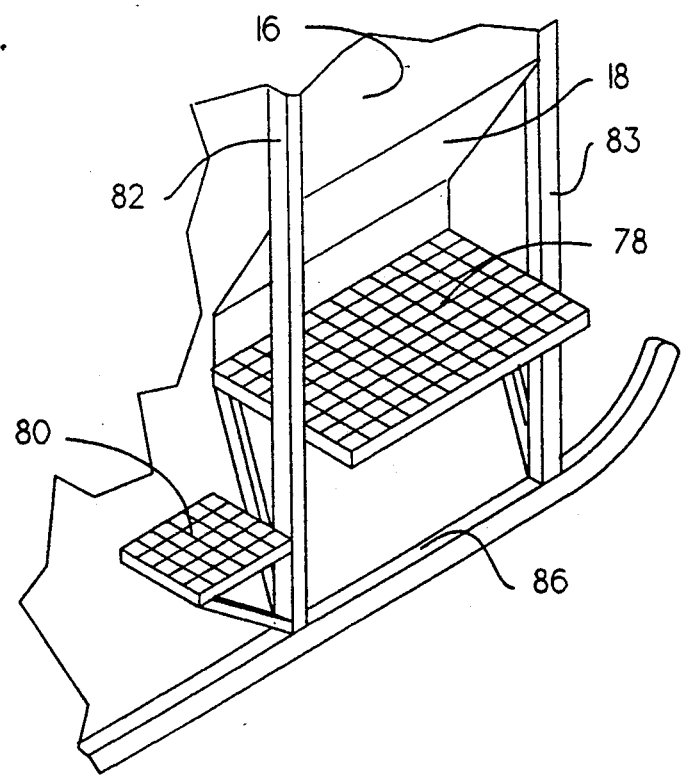
FIG. 9 is a cut-away perspective view of the present invention showing a step and platform.

Referring to FIG. 9, preferably the apparatus of the present invention includes a platform 78 which is mounted on the front side of the apparatus next to the hopper 10. The platform 78 is positioned on the side of the hopper 10 on which the lid 12 is located. In this manner, a person may stand on the platform 78 to place the chemical agent into the hopper 10 while the lid 12 of the hopper 10 is in an open position. In addition, a step 80 is attached to the apparatus of the present invention to assist a person in stepping up to the platform 78. The platform 78 and the step 80 are made from a piece of grid or grate steel. Preferably, the platform 78 is hingedly mounted to the apparatus of the present invention such that the platform can be swung down so that it does not extend beyond the sides of the hopper 10.

Overall, the apparatus of the present invention has dimensions of about 90 inches long by 46 inches wide by 69 inches high. This insures that the apparatus of the present invention can be moved to remote stream locations by vehicles as small as a pickup truck. The overall weight of the apparatus of the present invention is about 930 pounds. Preferably, the weight of the apparatus is kept at a minimum to increase the portability of the apparatus of the present invention.

The apparatus of the present invention has proven to work most effectively with pelletized chemical agents. In particular, a commercially available pelletized hydrated lime called pebble lime can be discharged effectively by the apparatus of the present invention into a flowing water stream. Early experiments using commercially available hydrated lime in powder form did not provide completely satisfactory discharge of the lime into a flowing water stream. In particular, the hydrated lime in powder form tended to bridge in the bottom portion of the hopper so that no lime was discharged to the water stream.

It should be appreciated that the description of the preferred embodiments is illustrative of the invention. Other modifications and changes could be made by one skilled in the art without departing from the invention. For example, the plates of the water wheel could be arranged in a different manner.

What is claimed is:

1. Apparatus for treating an open flowing water stream with a solid chemical agent, which comprises:
  a) means for containing said solid chemical agent;
  b) means for discharging said solid chemical agent from said containing means above a surface of the open flowing water stream at a rate which is proportional to an amount of mechanical energy which is supplied to said discharging means;
  c) means for generating an adjustable amount of mechanical energy from the open flowing water stream; and
  d) means for transferring said amount of mechanical energy from said generating means to said discharging means.

2. The apparatus of claim 1 wherein said solid chemical agent is in pellet form.

3. The apparatus of claim 1 further comprising a means for channeling the open flowing water stream proximate to said discharging means such that said solid chemical agent is discharged above an increased amount of the open flowing water stream.

4. The apparatus of claim 1 further comprising a base for supporting said containing means, said generating means, and said transferring means above the open flowing water stream.

5. The apparatus of claim 1 wherein said discharging means comprises a pipe enclosing a rotatable auger, said pipe having an opening facing the surface of the open flowing water stream, said pipe interconnecting with said containing means such that when said auger is rotated said solid chemical agent is transported from said containing means through said pipe and discharged through said pipe opening above the surface of the open flowing water stream at a rate which is proportional to the rate of rotation of said auger.

6. The apparatus of claim 1 wherein said generating means comprises a water wheel, said water wheel generating mechanical energy proportional to an amount of the open flowing water stream contacting said water wheel.

7. The apparatus of claim 6 wherein said water wheel further comprises a means for varying said amount of the open flowing water stream contacting said water wheel.

8. The apparatus of claim 1 wherein said containing means comprises a closeable opening located at the top of said containing means for loading solid chemical agent into said containing means.

9. The apparatus of claim 8 wherein said containing means funnels solid chemical agent placed within said containing means towards said discharging means.

10. Apparatus for treating a flowing water stream with a chemical agent, said apparatus comprising:
   a) a hopper for containing said chemical agent, said hopper comprising a closeable opening for placing said chemical agent into said hopper, said hopper having an opening for discharging said chemical agent from said hopper, wherein said hopper funnels chemical agent towards said opening;
   b) a pipe enclosing a rotatable auger, said pipe having an opening facing the flowing water stream, said pipe interconnecting with said hopper such that when said auger is rotated said chemical agent is transported from said hopper through said pipe and discharged through said opening to the flowing water stream at a rate which is proportional to the rate of rotation of said auger;
   c) a water wheel, said water wheel generating mechanical energy proportional to an amount of the flowing water stream contacting said water wheel, said water wheel comprising a means for varying said amount of the flowing water stream contacting said water wheel;
   d) means for transferring said amount of mechanical energy from said water wheel to said rotatable auger; and
   e) a base for supporting said hopper, said water wheel, and said transferring means above said flowing water stream.

11. The apparatus of claim 10 wherein the chemical agent is in pellet form.

12. The apparatus of claim 10 further comprising a conduit for channeling the flowing water stream into proximity with said opening of said pipe.

13. The apparatus of claim 10 wherein said base is no wider than said hopper and said base is about as long as the combination of the width of said hopper and the diameter of said water wheel.

14. The apparatus of claim 10 wherein said transferring means comprises a gear box.

15. Apparatus for treating an open flowing water stream with a solid chemical agent, which comprises:
   a) a hopper for containing said solid chemical agent, said hopper having a closeable first opening for placing said chemical agent into said hopper, said hopper having a second opening for discharging said solid chemical agent from said hopper, wherein said hopper funnels solid chemical agent towards said second opening; and
   b) means for discharging said solid chemical agent above a surface of the flowing water stream at a predetermined rate, said discharging means connected to said hopper whereby said solid chemical agent is funneled into said discharging means.

16. The apparatus of claim 15 wherein said solid chemical agent is in pellet form.

17. The apparatus of claim 15 further comprising a means for channeling the open flowing water stream proximate to said discharging means such that said solid chemical agent is discharged above an increased amount of the open flowing water stream.

18. The apparatus of claim 15 wherein said discharging means comprises a pipe enclosing a rotatable auger and a means for rotating said auger at a desired rate, said pipe having an opening facing said surface of the open flowing water stream, said pipe interconnecting with said containing means such that when said auger is rotated said chemical agent is transported through said pipe and discharged through said pipe opening above said surface of the open flowing water stream at a rate which is proportional to the rate of rotation of said auger.

* * * * *